UNITED STATES PATENT OFFICE.

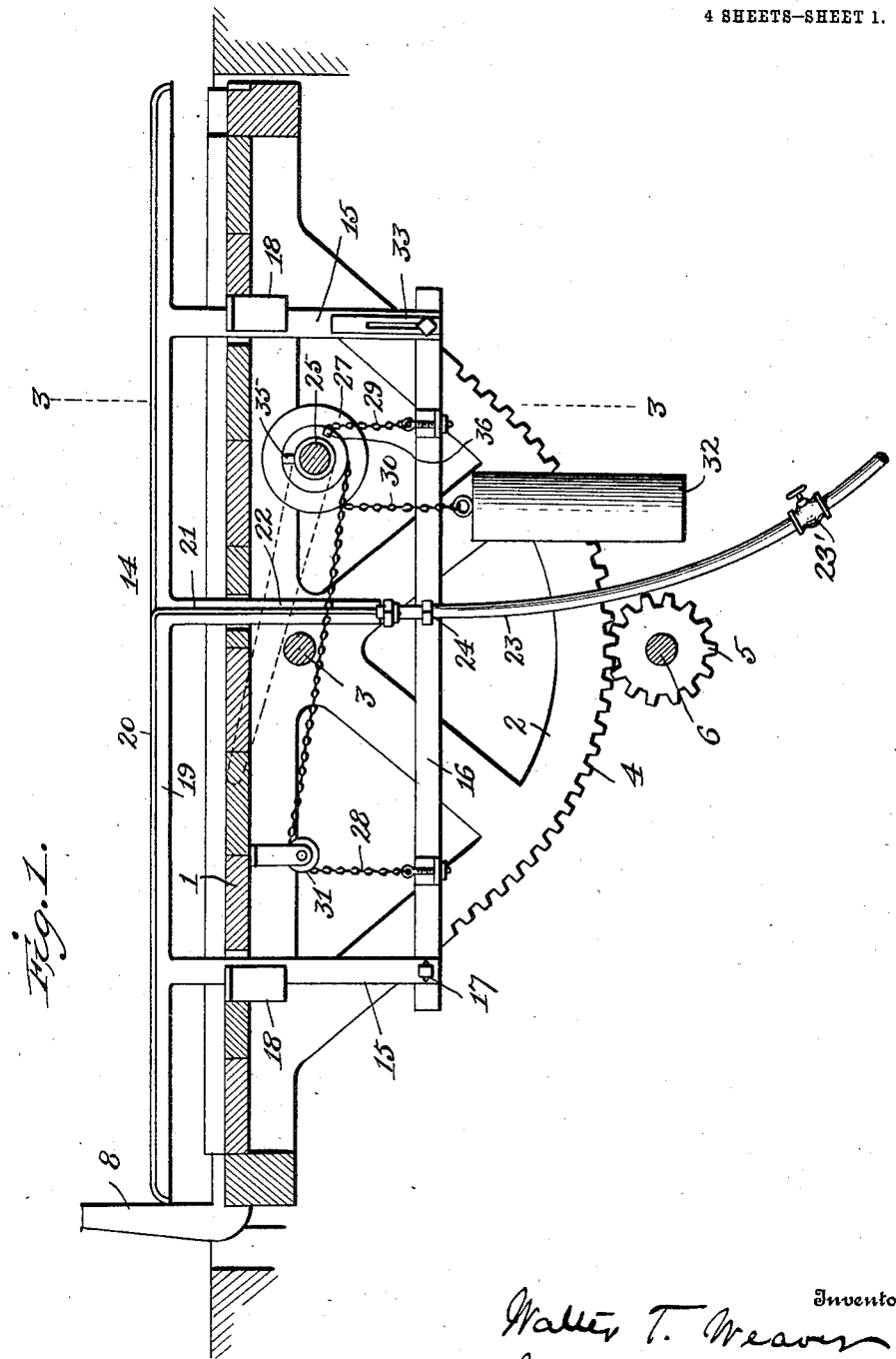

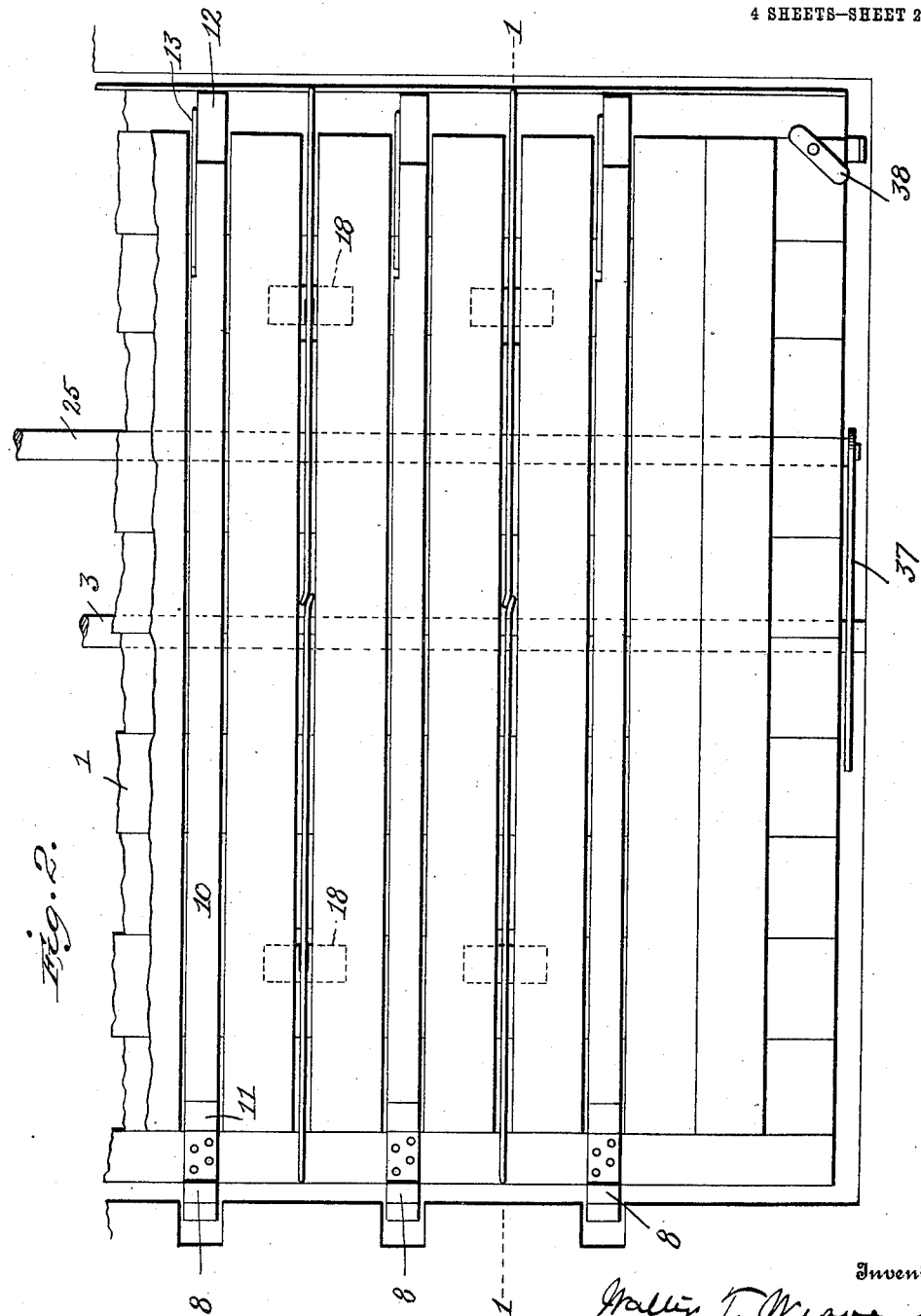

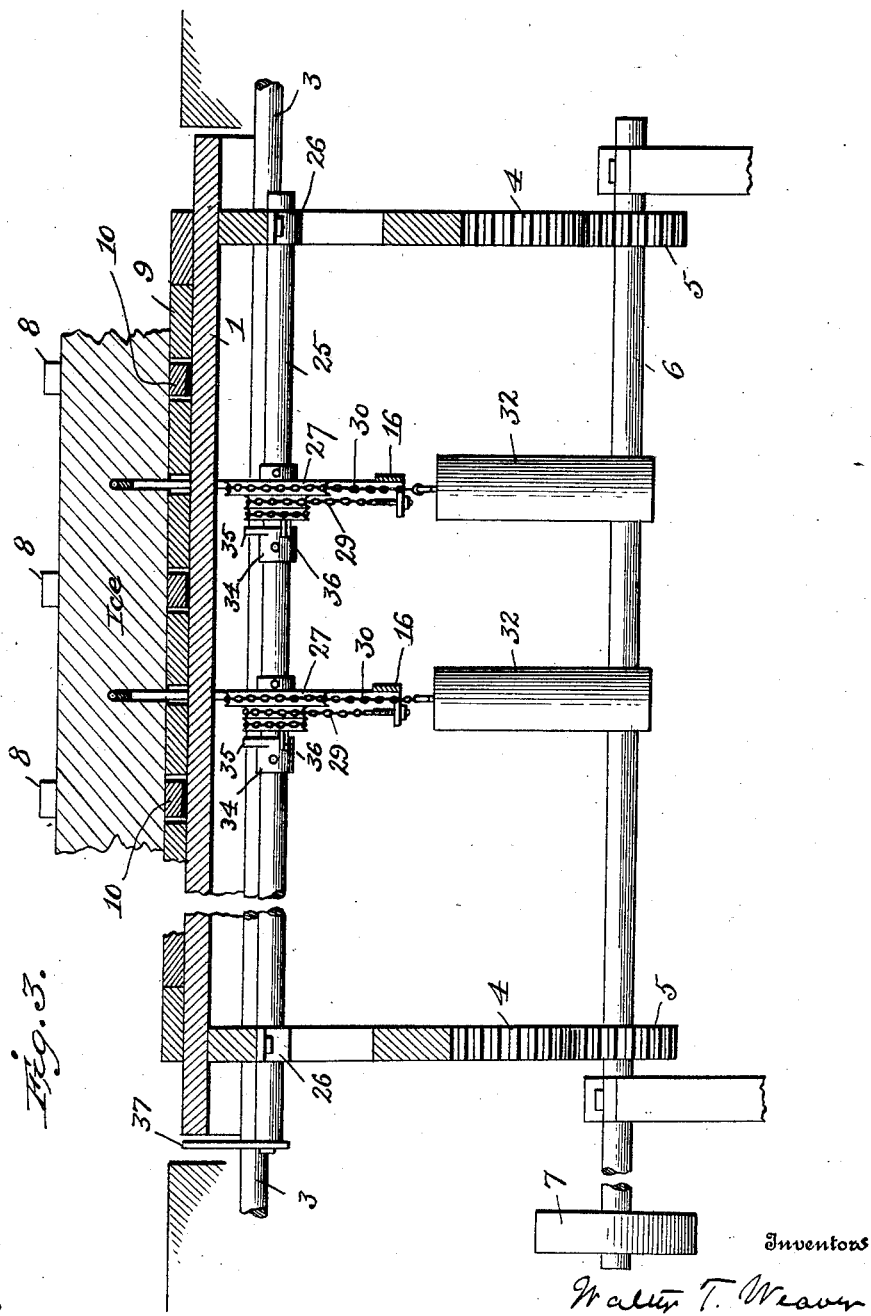

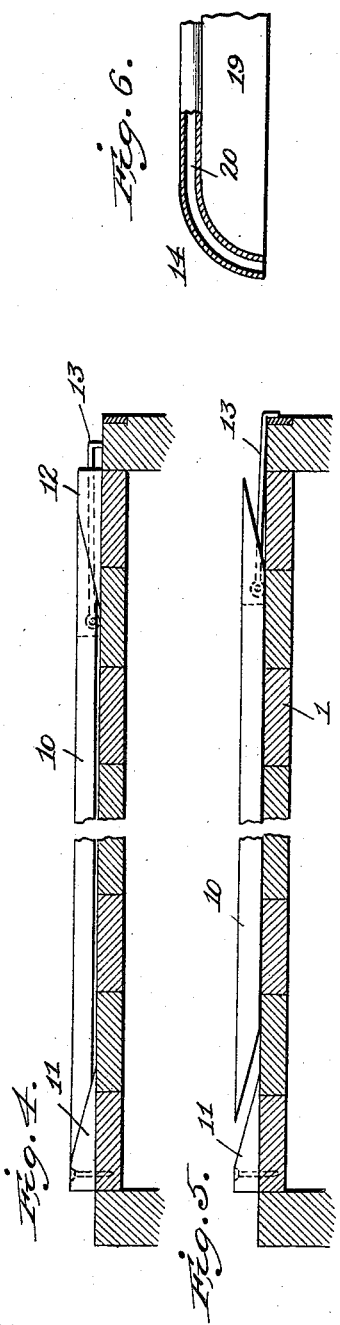
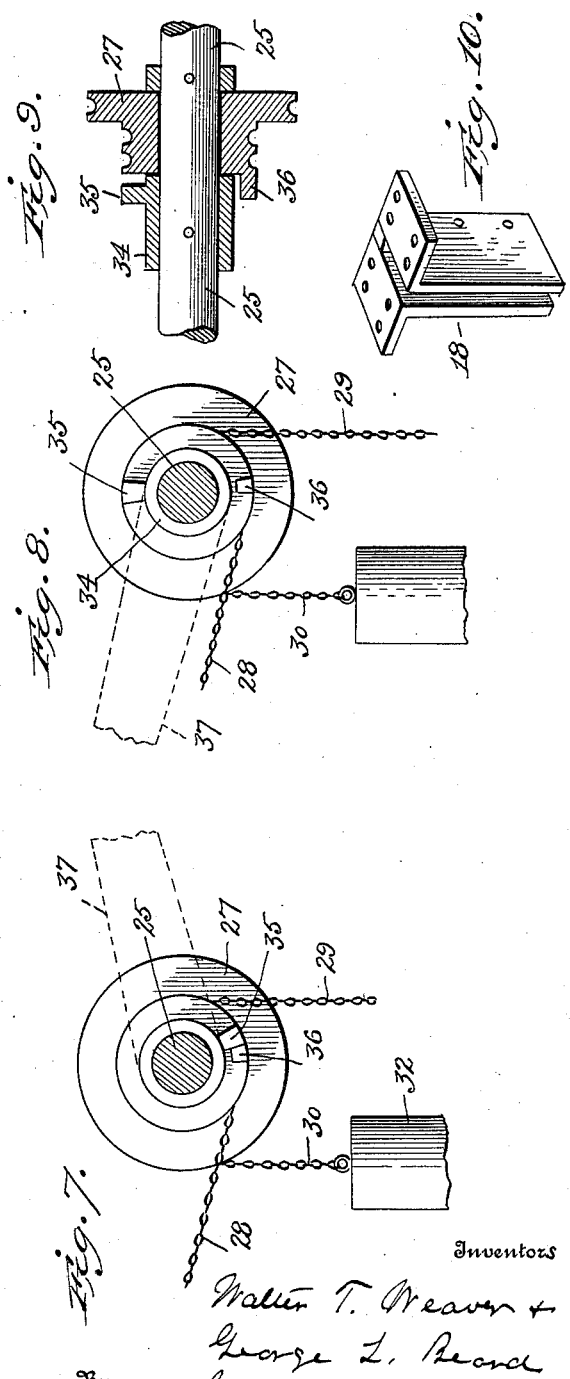

WALTER T. WEAVER, OF ALEXANDRIA COUNTY, VIRGINIA, AND GEORGE L. BEARD, OF WASHINGTON, DISTRICT OF COLUMBIA.

ICE-CUTTING APPARATUS.

1,030,624.     Specification of Letters Patent.     Patented June 25, 1912.

Application filed July 23, 1908. Serial No. 444,944.

*To all whom it may concern:*

Be it known that we, WALTER T. WEAVER, residing in the county of Alexandria and State of Virginia, and GEORGE L. BEARD, residing in Washington, in the District of Columbia, citizens of the United States, have invented certain new and useful Improvements in Ice-Cutting Apparatus, of which the following is a full, clear, and exact description, such as will enable those skilled in the art to which it appertains to make and use the same, reference being had to the accompanying drawings, forming part of this specification.

In the process of making plate-ice the water is frozen into sheets or plates of ice which, in a general way, have a length of twenty feet, a width of ten feet, a thickness of one foot, and weigh about five tons each. Before these plates or sheets can be handled for storing purposes or by the dealers, they must be cut into blocks of an average weight of about three hundred pounds.

The object of the present invention is to provide a cutting apparatus for dividing the plates into the smaller blocks.

The invention relates to improvements in ice-cutting machines which are employed to reduce ice-plates to cakes of a suitable size for handling and storing and more particularly in those machines in which the cutting is done by a heated blade. In such previous machines the heated blade is first presented to the upper surface of the ice-plate and the cut made downward, thereby forming a kerf open at the top and closed at the bottom. In such a kerf the heated water produced by the melting of the ice remains and melts the adjacent ice, which not only causes waste but also the sides of the kerf are rough and irregular so that the resulting cakes have uneven edges that prevent the proper handling and storing of the same.

In the invention in the present instance the heated blade is presented to the under side of the ice-plate and the cut is made upward, which produces a kerf that is open at the bottom and closed at the top. Such a kerf permits the heated water readily to escape and there can be no unnecessary melting of the adjacent ice. Consequently there is no waste and the sides of the kerf are smooth and the resulting cakes have even edges, which greatly facilitates the handling and storing of the same.

In the present invention a plurality of independently movable blades are mounted in the table on which the ice-plate is placed to be cut. Each blade is provided with an individual mechanism for forcing it upwardly from the table through the ice-plate. In its upward movement each blade acts independently of the other blades; and if for a reason one of the blades should be checked in its upward movement the stopping of this particular blade would in no way interfere with the upward movement of the other blades. A mechanism common to all of the blades operates to return them simultaneously to their initial position below the top surface of the table.

The invention consists in the novel construction, combination and arrangement of parts, such as will be hereinafter fully described, pointed out in the appended claims, and illustrated in the accompanying drawings.

In the drawings, in which similar reference characters designate corresponding parts, Figure 1 is a transverse sectional view on the line 1—1 of Fig. 2. Fig. 2 is a plan view, partly broken away, of the apparatus embodying the invention. Fig. 3 is a sectional view on the line 3—3 of Fig. 1. Fig. 4 is a detail sectional view showing one of the movable slats wedged up. Fig. 5 is a similar view showing the slat loose. Fig. 6 is a detail sectional view showing an end of one of the cutting-blades. Figs. 7, 8 and 9 are detail views showing the winding mechanism for raising the blades. Fig. 10 is a detail perspective view showing one of the guides for one of the blade-standards.

The table 1, which supports the ice-plate during the cutting operation, is carried by the segmental frames 2 mounted on the shaft 3 journaled at its ends in bearings (not shown) located in the walls of the table-pit. On the lower edges of the segmental frames are the gear-teeth 4 concentric with the shaft 3. Meshing with the gear-teeth are the pinions 5 on the shaft 6, which is rotated by the pulley 7 driven by any suitable power. By rotating the pinions the table can be turned to any desired inclination to receive the ice-plate. On one edge of the table are the posts 8 against which the ice-plate rests when the table is in an inclined position.

Extending transversely of the table 1 are the fixed slats 9 spaced apart with the movable slats 10 between them. At the ends of the movable slats adjacent to the posts 8 are the fixed wedges 11 and at the opposite ends of the slats are the movable wedges 12. By means of these wedges the movable slats can be adjusted to accommodate the ice-plate. To the ends of the movable slats adjacent to the movable wedges are the hinged hooks 13 to engage the edge of the table to hold the slats in place while the table is tilted.

At intervals across the table extend the ice-cutting blades 14 mounted on the upper ends of the standards 15 connected at their lower ends by the cross-pieces 16. As the edge and back of the blade are formed of different metals that expand unequally on application of heat, the blade bows slightly when heated. To allow the bowing of the blade the cross-piece has a sliding connection 17 with one of the standards. The standards are movable in the guides 18 secured to the table. These guides are open on one side to give free movement to the standards and to prevent binding therein.

Each ice-cutting blade comprises the iron back 19 and the copper tubes 20 extending along its edge. The inner ends of the tubes, as at 21, are turned downwardly and extend along opposite sides of the arm 22 projecting from the under edge of the back. To the lower ends of the tubes 21 is connected an end of the flexible pipe 23 leading from a source of heated fluid under pressure, preferably steam. The pipe 23 is controlled by the valve 23'. The pipe is secured to the cross-piece 16, as at 24, and is thereby held in place. The pipe is of sufficient length to accommodate the movement of the table when the latter is tilted and also to accommodate the movement of the blade upward from the table.

Means are provided for raising and lowering the ice-cutting blades relative to the table. Beneath the table and extending longitudinally of the same is the shaft 25 journaled in bearings 26 on the segmental frames 2. On this shaft are the loose pulleys 27, one for each blade. Each pulley has in its periphery three grooves respectively carrying the chains 28, 29, 30, each being fastened at its inner end to the pulley. The outer end of the chain 28 passes over the roll 31 attached to the under side of the table and is secured to one end of the cross-piece 16; the outer end of the chain 29 is secured to the other end of the cross-piece 16; and to the outer end of the chain 30 is attached the weight 32. The chains 28, 29 connected with the cross-piece wind on the pulley in the same direction, while the chain 30 connected with the weight winds in the opposite direction. That part of the pulley carrying the chain 30 is of greater diameter than the part carrying the other two chains to give the weight a greater leverage. The purpose of the weight is to unwind its chain to rotate the pulley to wind the other two chains to raise the cutting-blade. The upward movement of the blade is regulated by the adjustable stop 33 on one of the standards 15 engaging the guide 18 above. Adjacent to each pulley is the clutch or sleeve 34 fixed on the shaft 25. On the sleeve is the lug 35 to engage the lug 36 on the pulley. By rotating the shaft 25 by turning down the lever 37 on its end the sleeves are turned so that the lugs 35 and 36 engage to turn the pulley to wind the chain 30 and to unwind the chains 28, 29, thereby lowering the cutting-blade. The lever is secured in its downward position by the catch 38 pivoted to the table.

The operation of the apparatus is as follows: By means of the turning mechanism the table is tilted to a vertical position, or nearly so, with the side having the posts 8 downward. Before the table is tilted the hooks 13 are turned to engage the adjacent edge of the table to hold the movable slats 10 in place. After the table is tilted the suspended ice-plate is moved against the table with the lower edge resting on the post 8. After the ice-plate is released from the crane the table is turned to its horizontal position. As ice-plates do not have a uniform thickness they do not lie evenly on the table. Should an attempt be made to cut the ice the plate would crack in different directions and irregular pieces would result. To avoid this, the hooks 13 are released from the edge of the table and the movable wedges 12 are driven beneath the ends of the movable slats 10, which in turn are driven upon the fixed wedges 11 at their opposite ends. The slats are wedged until they bear against the under side of the ice-plate and as there is a number of them the weight of the ice-plate is evenly distributed on its support so that there will be no strain in any particular part. Consequently there will be no accidental cracking of the ice-plate during the cutting operation. In their inoperative positions the cutting-blades 14 are depressed so as to be below the top of the table. While in this position the chains 28, 29 are unwound from their respective pulleys while the chains 30 are wound thereon. The pulleys are held by the sleeves 34 and the engaging lugs so that the weights 32 cannot operate to turn them as shown in Fig. 7. The shaft 25 is turned to release the weights by disengaging the lugs of the sleeves and pulleys as shown in Fig. 8. The weights being released, by the unwinding of their chains they rotate the pulleys to wind thereon the chains 28, 29, which forces their respective blades upward against the under side of the ice-plate. Steam or other heated fluid under pressure is admitted to all of the tubes 20 of the blades by opening the valves 23' in their communications 23 with the steam supply. This heats each blade and it melts the ice against which it is pressed. As the ice melts a kerf is cut in the under side of the plate, which deepens until it extends all the way through. As the kerf is open at the bottom, as shown in Fig. 3, the heated water readily escapes. Consequently the water cannot further melt the ice and the sides of the kerf will be even and smooth all the way through and its width will be no greater than the blade. By cutting the ice in this way the resulting cakes will have even smooth edges and can be stored and handled to the best advantage. The escape of the water from the kerf not only prevents unnecessary melting, but conserves the heat of the blade. Should the water remain in the kerf it would extract heat from the blade which otherwise would aid in melting the ice in advance of the blade. After the blade has passed through the ice-plate its upward movement is limited by the stop 33 engaging the guide 18. This stop can be adjusted according to the thickness of the ice-plate. The blades in their upward movement through the ice-plate act independently of each other so that the rate of progress of one, which is controlled by the density and thickness of the ice at that point and the distance of the blade from the supply of heated fluid, will not effect the operation of any of the other blades. Also the weight gives a yielding pressure to the blade permitting the latter to follow the kerf as it is made. Should an obstruction, such as a chip, be frozen in the ice in the path of travel of the blade, the latter will stop without injury to the apparatus or interfering in any way with the operation of the other blades. After all the blades have cut through the ice-plate the heated fluid is cut off and the blades are returned to their original positions below the top of the table. This is done by turning the shaft 25 so that the lugs of the sleeves 34 engage the lugs of the pulleys 27. The latter are rotated so as to wind thereon the chains carrying the weights 32 and to unwind the chains connected with the cross-pieces 16, which permits the blades to drop by gravity to their original positions. The cakes into which the ice-plate has been cut are then removed from the table and stored in the usual manner.

Having thus described our invention, what we claim and desire to secure by Letters-Patent is,

1. In apparatus for cutting ice, a tilting table to support the ice-plate, a blade movably mounted in the tilting table, mechanism for moving the blade upwardly from the tilting table to force the blade upwardly through the ice-plate supported on the table, and means for conducting a heating medium to the blade operating to accommodate the tilting of the table and also the movement of the blade upward from the table.

2. In apparatus for cutting ice, a tilting table to support the ice-plate, a hollow blade movably mounted in the tilting table, mechanism for moving the hollow blade upwardly from the tilting table to force the blade upwardly through the ice-plate supported on the table, and means for supplying a heating fluid to the hollow blade operating to accommodate the tilting of the table and also the movement of the blade upward from the table.

3. In apparatus for cutting ice, a tilting table to support the ice-plate, a blade movably mounted in the tilting table, yielding mechanism carried by the tilting table for moving the blade upwardly from the tilting table to force the blade upwardly through the ice-plate supported on the table, and yielding means for conducting a heating medium to the blade operating to accommodate the tilting of the table and also the movement of the blade upward from the table.

4. In apparatus for cutting ice, a tilting table to support the ice-plate, a hollow blade movably mounted in the tilting table, mechanism for moving the hollow blade upwardly from the tilting table to force the blade upwardly through the ice-plate supported on the tilting table, and yielding means for supplying a heating fluid to the hollow blade operating to accommodate the tilting of the table and also the movement of the blade upwardly from the table.

5. In apparatus for cutting ice, a tilting table to support the ice-plate, a blade movably mounted in the tilting table, means for conducting a heating medium to the blade, and yielding mechanism for moving the blade upwardly from the tilting table to force the blade through the ice-plate supported on the tilting table so as to be checked by an obstruction in the ice meeting the blade.

6. In apparatus for cutting ice, a tilting table to support the ice-plate, a blade movably mounted in the tilting table, means for conducting a heating medium to the blade, yielding mechanism for moving the blade upwardly from the tilting table to force the blade through the ice-plate supported on the tilting table so as to be checked by an obstruction in the ice meeting the blade, and mechanism for returning the blade to its initial position in the table against the action of the yielding mechanism for moving the blade upwardly from the table.

7. In apparatus for cutting ice, a tilting table to support the ice-plate, a plurality of independently operating blades movably mounted in the tilting table, means for conducting a heating medium to the blades, and mechanism for simultaneously moving the blades upwardly from the tilting table to force them upwardly through the ice-plate supported on the tilting table.

8. In apparatus for cutting ice, a tilting table, a hollow blade movably mounted in said table, and a flexible pipe communicating with said hollow blade.

9. In apparatus for cutting ice, a table for supporting the ice-plate, a plurality of heated blades movably mounted in said table below the ice-plate, mechanisms operating independently of each other for moving said blades upward from the table through the ice-plate, and means common to all of said raising mechanisms for reversing the action of the latter to simultaneously lower the blades to their original positions.

10. In apparatus for cutting ice, a table, fixed slats on said table, movable slats between said fixed slats, and wedges for adjusting said movable slats.

11. In apparatus for cutting ice, a tilting table, fixed slats on said table, movable slats between said fixed slats, wedges for adjusting said movable slats, and hooks on said movable slats to engage the table when the latter is tilted to hold the movable slats in place.

12. In apparatus for cutting ice, a tilting table to support the ice-plate, a plurality of independently operating blades movably mounted in the tilting table, mechanism for simultaneously moving the blades upwardly from the tilting table to force them upwardly through the ice-plate supported on the tilting table, and yielding means for conducting a heating medium to the blades operating to accommodate the tilting of the table and also the movement of the blades from the table.

13. In apparatus for cutting ice, a tilting table to support the ice-plate, a plurality of hollow blades independently operating and movably mounted in the tilting table, means for simultaneously supplying a heating fluid to the hollow blades, and mechanism for simultaneously moving the hollow blades upwardly from the tilting table to force them through the ice-plate supported on the tilting table.

14. In apparatus for cutting ice, a tilting table to support the ice-plate, a plurality of hollow blades movably mounted in the tilting table, mechanism for simultaneously moving the hollow blades upwardly from the tilting table to force them through the ice-plate supported on the tilting table, and yielding means for simultaneously supplying a heating fluid to the hollow blades operating to accommodate the tilting of the table and also the movement of the blades upwardly from the table.

15. In apparatus for cutting ice, a tilting table to support the ice-plate, a plurality of independently operating blades movably mounted in the tilting table, means for conducting a heating medium to the blades, and yielding mechanism for simultaneously moving the blades upwardly from the tilting table to force them through the ice-plate supported on the tilting table.

16. In apparatus for cutting ice, a tilting table to support the ice-plate, a plurality of independently movable blades mounted in the table, means for conducting a heating medium to the blades, mechanism for simultaneously moving the blades upwardly from the tilting table to force them through the ice-plate supported on the tilting table, and mechanism for simultaneously returning the blades to their initial position in the tilting table.

17. In apparatus for cutting ice, a tilting table to support the ice-plate, a plurality of independently movable blades mounted in the table, means for conducting a heating medium to the blades, and independently operating yielding mechanisms for simultaneously moving the blades upwardly from the tilting table through the ice-plate supported on the tilting table.

18. In apparatus for cutting ice, a tilting table to support the ice-plate, a plurality of independently movable blades mounted in the table, means for conducting a heating medium to the blades, independently operating yielding mechanisms for simultaneously moving the blades upwardly from the tilting table through the ice-plate supported on the tilting table, and controlling means common to all of the yielding mechanisms operating to release simultaneously all the yielding mechanisms preliminary to a cutting operation and said controlling means also operating to return simultaneously all the yielding mechanisms to their initial position after the completion of a cutting operation.

19. In apparatus for cutting ice, a tilting table to support the ice-plate, a plurality of independently movable blades mounted in the table, means for conducting a heating medium to the blades, independently operating yielding mechanisms for simultaneously moving the blades upwardly from the tilting table, and controlling means common to all of the yielding mechanisms operating to release simultaneously all the yielding mechanisms preliminary to a cutting operation and said controlling means also operating to return simultaneously all the yielding mechanisms to their initial position after the completion of a cutting operation.

20. In apparatus for cutting ice, a table to support the ice-plate, a plurality of independently movable blades mounted in said table, means for conducting a heating medium to said blades, and an individual actuating mechanism for each blade for moving the blade upwardly from the table independent of the action of the other blades.

21. In apparatus for cutting ice, a table to support the ice-plate, a plurality of independently movable blades mounted in said table, means for conducting a heating medium to said blades, an individual actuating mechanism for each blade for moving the blade upwardly from the table independent of the action of the other blades, and mechanism common to all of the blades for simultaneously returning them to their initial positions in the table against the action of their respective actuating mechanisms.

22. In apparatus for cutting ice, a tilting table to support the ice-plate, a plurality of independently movable blades mounted in said table, an individual actuating mechanism for each blade for moving the blade upward from the table independent of the action of the other blades, and yielding means for conducting a heating medium to the blades operating to accommodate the movement of the table and also the movement of the blades relative to the table.

23. In apparatus for cutting ice, a tilting table to support the ice-plate, a plurality of independently movable blades mounted in said table, an individual actuating mechanism for each blade for moving the blade upwardly from the table independent of the action of the other blades, mechanism common to all of the blades for simultaneously returning them to their initial positions in the table against the action of their respective actuating mechanisms, and yielding means for conducting a heating medium to the blades operating to accommodate the movement of the table and also the movement of the blades relative to the table.

24. In apparatus for cutting ice, a cutting blade comprising a back, tubes extending along the edge of the back opening at their outer ends at the ends of the back to the atmosphere and at their inner ends turned inwardly from the edge of the back, and means for supplying heating fluid communicating with the inner ends of the tubes.

25. In apparatus for cutting ice, a table to support the ice-plate, a cutting blade movably mounted in said table comprising a back, tubes extending along the edge of the back opening at their outer ends at the ends of the back to the atmosphere and at their inner ends turned inwardly from the edge of the back, mechanism for moving the cutting blades upwardly from the table through the ice-plate supported thereon, and a flexible pipe communicating with the inner ends of said tubes to supply a heating fluid to the same and operating to accommodate the movement of the blade relative to the table.

26. In apparatus for cutting ice, a tilting table to support the ice-plate, a cutting blade movably mounted in said table comprising a back, tubes extending along the edge of the back opening at their outer ends at the ends of the back to the atmosphere and at their inner ends turned inwardly from the edge of the back, yielding means for forcing the blade upwardly from the tilting table, and a flexible pipe communicating with the inner ends of said tubes to supply heated fluid thereto operating to accommodate the tilting of the table and also the movement of the blade relative to the table.

27. In apparatus for cutting ice, a table to support the ice-plate, guides 18 in said table, standards 15 movable in said guides through the table, a back 19 on the upper ends of said standards extending across the table, tubes 20 on the upper edge of said back, a flexible pipe 23 communicating with said tubes for supplying heating fluid thereto, a cross-piece 16 connecting the lower ends of said standards, and mechanism connected with said cross-piece to force the back and tubes upward from the table.

28. In apparatus for cutting ice, a table to support the ice-plate, guides 18 in said table, standards 15 movable in said guides through the table, an iron back 19 on the upper ends of said standards extending across the table, copper tubes 20 extending along the upper edge of said back, a flexible pipe 23 for supplying heating fluid to said tubes, a cross-piece 16 having a sliding connection, as at 17, with said standards to accommodate the bowing of the back and tubes owing to the unequal expansion of the metals forming the back and tubes, and mechanism connected with said cross-piece to force the back and tubes upward from the table.

29. In apparatus for cutting ice, a table to support the ice-plate, guides 18 in said table, standards 15 movable in said guides through the table, and adjustable stop 33 on one of said standards to regulate the upward movement of such standard, an arm 22 projecting downward from the under edge of said back through the table, tubes 20 extending along the upper edge of said back open at their outer ends to the atmosphere and with their inner ends 21 extending downward on opposite sides of the arm 22, a cross-piece 16 connecting the lower ends of said standards, mechanism connected with said cross-piece for forcing the back and tubes upward from the table, and a flexible pipe 23 communicating with the inner ends 21 of said tubes to supply heating fluid thereto.

30. A table to support the ice-plate, a hollow cutting blade movable in said table, a flexible pipe for supplying heating fluid to said blade, a shaft journaled in said table, a pulley loose on said shaft, a chain wound on said pulley in one direction and connected with said cutting blade, a second chain wound on said pulley opposite to the first chain, a weight on the second chain operating to rotate the pulley to wind the first chain thereon to force the cutting blade upward from the table, a clutch fast on said shaft to engage the pulley, and means for rotating said shaft to engage said clutch with the pulley to rotate the latter to wind the weight chain thereon and to unwind the chain connected with the blade to lower the latter.

31. A table to support the ice-plate, a plurality of independently movable blades mounted in said table, means for conducting a heating medium to said blades, a shaft journaled in said table, a series of pulleys loose on said shaft with a pulley adjacent to each blade, a chain wound on each pulley and connected with the adjacent blade, a second chain wound on each pulley opposite to the first chain, a weight on the second chain tending to rotate the pulley to wind the first chain thereon to raise the adjacent blade, a clutch fast on said shaft adjacent to each pulley, and means to rotate said shaft to turn all of the clutches to engage their respective pulleys to rotate the latter against their weights to wind up the weight chains and to unwind the blade chains to lower the blades to their initial position in the table.

In testimony whereof we hereunto affix our signatures in the presence of two witnesses.

WALTER T. WEAVER.
GEORGE L. BEARD.

Witnesses:
LILLIAN MAE BENTON,
B. A. BOWLES.

Copies of this patent may be obtained for five cents each, by addressing the "Commissioner of Patents, Washington, D. C."